United States Patent
Kon et al.

[11] Patent Number: 6,099,436
[45] Date of Patent: Aug. 8, 2000

[54] LOCK-UP CLUTCH CONTROL APPARATUS

[75] Inventors: Takanori Kon; Yoshiharu Saito; Yasushi Inagawa; Yoshikazu Nemoto, all of Wako, Japan

[73] Assignee: Honda Giken Kogyo Kabushiki Kaisha, Tokyo, Japan

[21] Appl. No.: 09/217,081

[22] Filed: Dec. 21, 1998

[30] Foreign Application Priority Data

Dec. 22, 1997 [JP] Japan ................................ 9-353786

[51] Int. Cl.⁷ .................................................. B60K 41/28
[52] U.S. Cl. .......................... 477/64; 192/3.31; 477/169
[58] Field of Search ............................. 477/62, 86, 180, 477/64, 65, 169; 192/3.31

[56] References Cited

U.S. PATENT DOCUMENTS

| | | | |
|---|---|---|---|
| 5,035,308 | 7/1991 | Baba et al. | 477/62 X |
| 5,086,894 | 2/1992 | Iizuka et al. | 477/180 X |
| 5,133,232 | 7/1992 | Kikuchi et al. | 477/62 X |
| 5,643,137 | 7/1997 | Suzuki | 477/180 X |
| 5,683,327 | 11/1997 | Inuzuka et al. | 477/62 |
| 5,865,704 | 2/1999 | Takagi et al. | 477/62 |
| 5,879,266 | 3/1999 | Sawamura et al. | 477/62 |

FOREIGN PATENT DOCUMENTS 07332479  12/1995  Japan .

*Primary Examiner*—Rodney H. Bonck
*Attorney, Agent, or Firm*—Armstrong, Westerman, Hattori, McLeland & Naughton

[57] ABSTRACT

The lock-up clutch control apparatus is provided with reference values for operating variations of the accelerator pedal predetermined for respective gear positions. The lock-up clutch control apparatus comprises a tightening permission judgement device 25 for judging whether it is appropriate to permit or prohibit tightening of the lock-up clutch, based on comparison between a reference value and an operating variation at present car conditions. Thereby, the lock-up clutch control apparatus is capable of reflecting the driver's intention to accelerate or reduce the car speed and is capable of enhancing drivability as well.

2 Claims, 5 Drawing Sheets

LOCK-UP CLUTCH CONTROL APPARATUS

BACKGROUND OF THE INVENTION

1. Field of the Invention

The present invention relates to a lock-up clutch control apparatus for controlling an engaging force of a lock-up clutch which transmits an output power of an engine to an input axis of the transmission while distributing the output power of the transmission with the torque converter.

This application is based on Patent Application No. Hei 9-353786 filed in Japan, the content of which is incorporated herein by reference.

2. Background Art

An example of the lock-up clutch control apparatus for transmitting the output power of the engine to the input axis of the transmission while distributing the output power of the transmission with the torque converter is disclosed in, for example, Japanese Patent Application, First Publication No. Hei 7-332479. This type of conventional lock-up clutch control apparatus controls the lock-up clutch following a map containing control parameters in relation to car speeds or openings of an accelerator pedal.

However, since conventional maps are set by car speed or the opening of the accelerating pedal, conventional maps do not reflect the driver's will to accelerate or to reduce the car speed in terms of dynamic operating variations such as depression and release of the accelerator pedal. Accordingly, when the driver depresses the accelerator pedal for accelerating the car, the car speed is sometimes reduced due to a reduction in engine revolutions, because the lock-up clutch is rendered tight by the map control. Thereby, a problem arises that the driver experiences an uneasy feeling which degrades the drivability of the car.

It is, therefore, an object of the present invention to provide a lock-up clutch apparatus which is capable of reflecting the driver's will for acceleration or reduction of the car speed by the driver's dynamic operating variations such as depression and release of the accelerator pedal; and thereby is capable of improving drivability.

SUMMARY OF THE INVENTION

According to one aspect of the present invention, a lock-up clutch control apparatus of the present invention is used for controlling an engaging force of a lock-up clutch which transmits the output power of an engine while distributing the output power of the engine into a torque converter. This lock-up clutch control apparatus is provided with reference values of operating variations of the accelerator pedal predetermined for each gear position and possesses a tightening permission judgement means for judging whether it is appropriate to permit or prohibit tightening of the lock-up clutch to a tighter position according to a result of comparison between the reference value and the operating variation at the present conditions.

According to another aspect of the present invention, a lock-up clutch control apparatus of the present invention possesses an acceleration/deceleration state judgement means and a tightening permission judgement means. The tightening permission judgement means permits tightening of the lock-up clutch to a tighter position, when the acceleration/deceleration state judgement means; judges that the car is going to be accelerated and the tightening permission judgement means permits tightening of the lock-up clutch without executing the tightening permission judgement means, when said acceleration/deceleration state judgement means judges that the car speed is going to be reduced.

DESCRIPTION OF PREFERRED EMBODIMENTS

The present invention will be described in detail hereinafter with reference to preferred embodiments of the present invention referring to the attached drawings.

Figure 1:
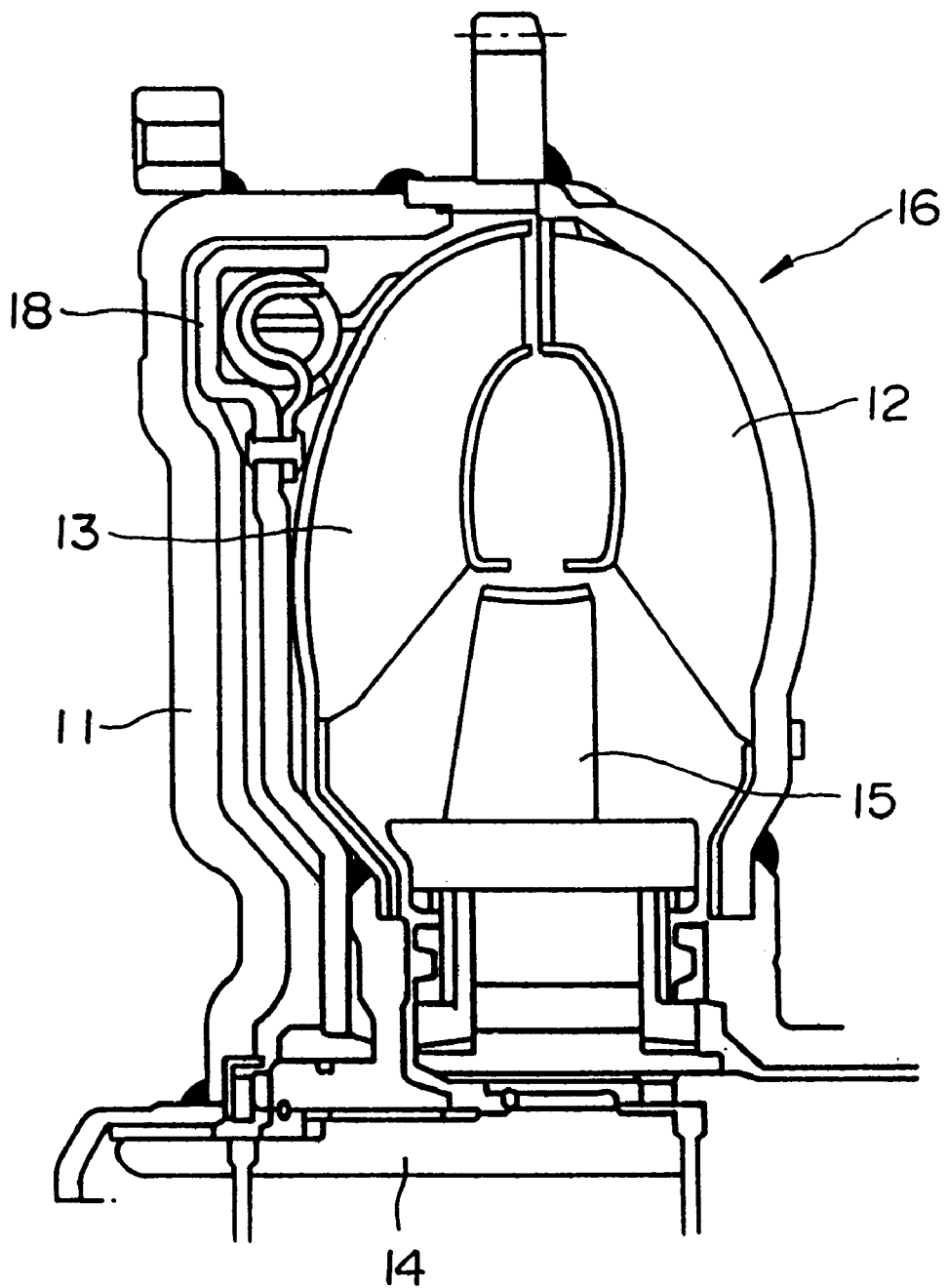
FIG. 1 shows a cross sectional view of a lock-up clutch and a torque converter which are controlled by the lock-up clutch according to an embodiment of the present invention.

In FIG. 1, the reference numeral 11 indicates a cover connected to a crank shaft which corresponds to an output axis of an engine (not shown). The reference numeral 12 indicates a pump impeller which is fixed with the cover 11 and which is rotated together with the cover 11, the reference numeral 13 indicates a turbine runner which is disposed facing to the pump impeller 12, the reference numeral 14 indicates an input axis of the transmission which is fixed to the turbine runner 13, and the reference numeral 15 indicates a stator disposed inside of both of the pump impeller 12 and the turbine runner 13. Here, the torque converter 16 is constructed by the pump impeller 12, the turbine runner 13, and the stator 15.

The lock-up clutch indicated by the reference numeral 18 is a component for transmitting the output of the engine to the input axis 14 of the transmission, while distributing the output of the engine with the torque converter 16. The lock-up clutch 18 is disposed in between the cover 11 and the turbine runner 13 and is fixed to the input axis 14 of the transmission. Accordingly, the lock-up clutch 18 is brought into contact with or separated from the cover 11 depending on a fluid pressure difference generated at both sides of the lock-up clutch 18, that is, the cover 11 side and the turbine runner 13 side.

When the lock-up clutch 18 is bought into contact with the cover 11 and is fixed with the cover (hereinafter, this fixed state is called "tight"), the driving power from the engine is directly transmitted to the input axis 14 of the transmission without passing through the torque converter 16. While, when the lock-up clutch is completely separated from the cover 11 (hereinafter, this state is called "OFF"), all of the driving power input from the engine is transmitted to the pump impeller 12 and the turbine runner 13 is rotated at its full speed by the rotation of the pump impeller 12; thereby the engine power is transmitted to the input axis 14 of the transmission by rotation of the turbine runner 13 (that is, passing through the torque converter 16).

Consequently, the lock-up clutch 18 controls distribution of the amount of the driving power transmitted to the input axis 14 of the transmission through the lock-up clutch 18 and the amount of the driving power transmitted through the torque converter 16 by controlling a degree of contact or the engaging force of the lock-up clutch 18 with the cover 11 according to the pressure difference. In addition, the above mentioned fluid pressure difference is controlled by two duty solenoids or linear solenoids (not shown) or the like.

Figure 2:
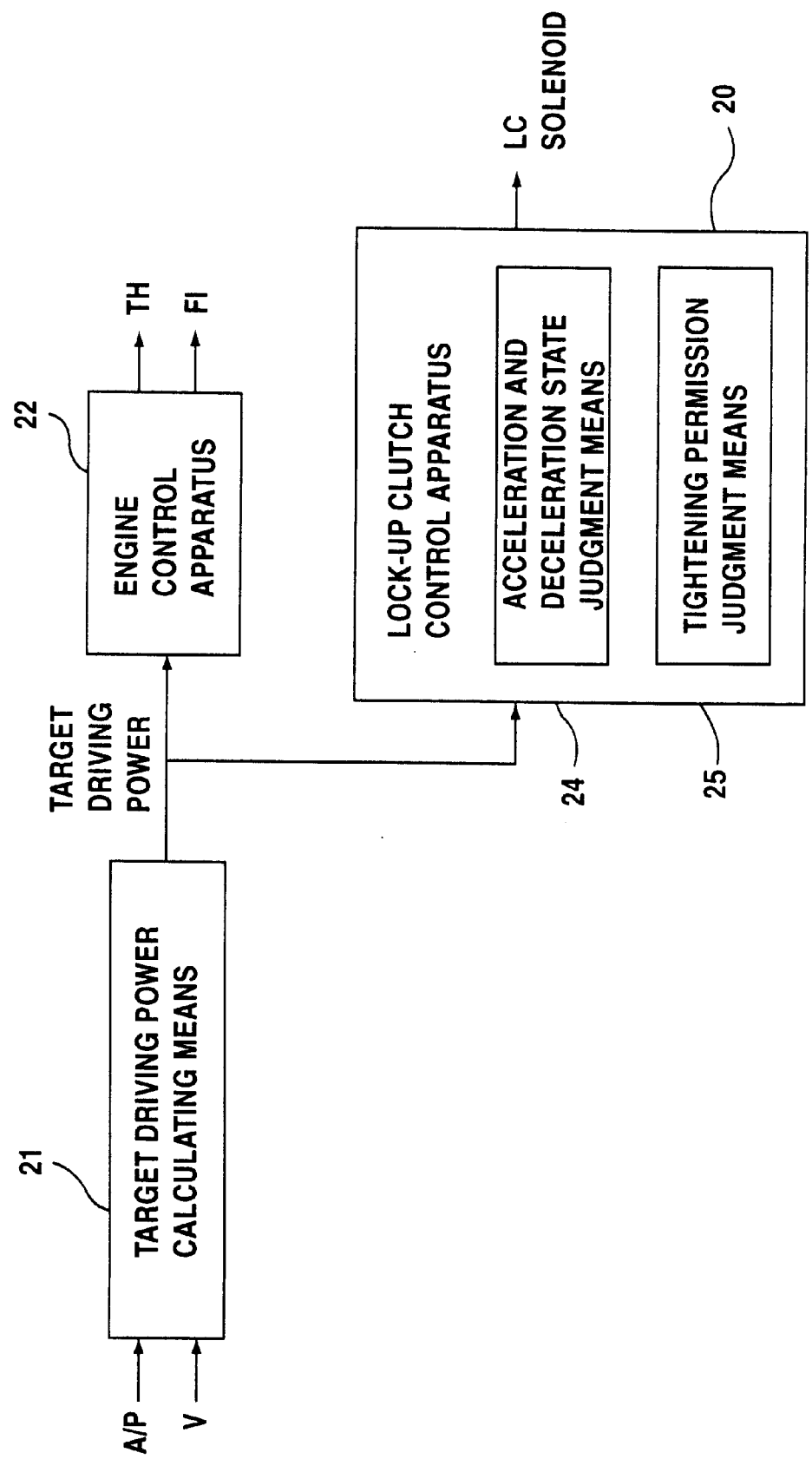
FIG. 2 is a block diagram showing a clutch control apparatus according to an embodiment of the present invention.

The lock-up clutch control apparatus 20 is designed so as to control the engaging force of the lock-up clutch 18 with the cover 11 by controlling the fluid pressure difference through the control by, for example, two duty solenoids. As shown in FIG. 2, the lock-up clutch control apparatus 20 is connected to a target driving power estimating means 21.

Figure 3:
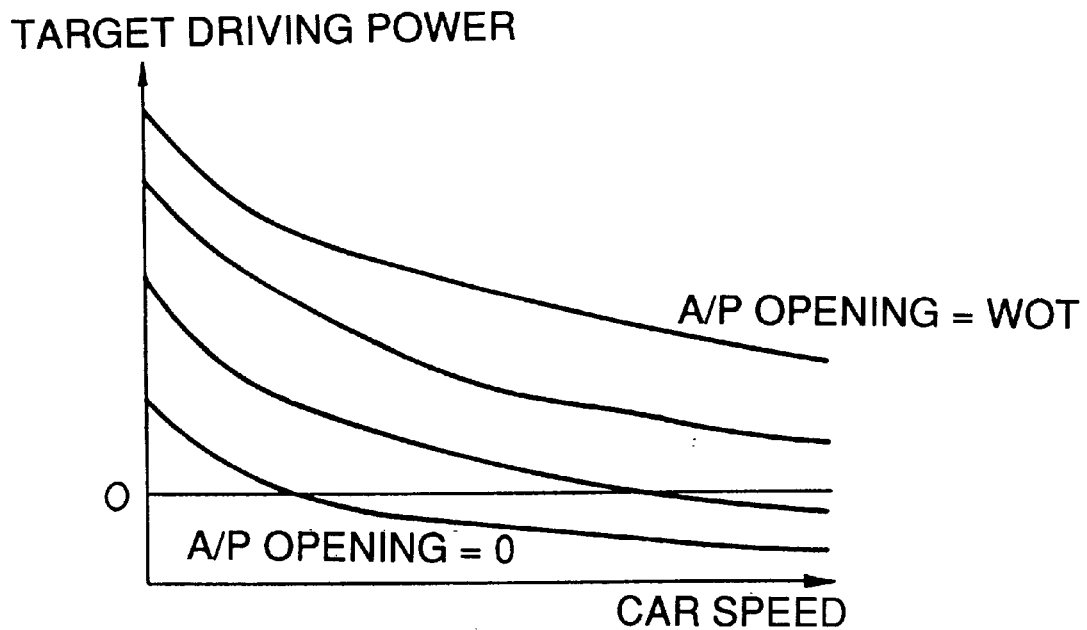
FIG. 3 shows a map for calculating a target driving force by a target driving force calculating means.

This target driving power estimating means 21 estimates a target driving power in line with the driver's intention to accelerate the car based on detected values of car speed and the accelerator pedal opening in accordance with a map shown in, for example, FIG. 3, and outputs a signal which represents the target driving power obtained by the above estimation. In FIG. 3, the horizontal axis represents the car speed V, the vertical axis represents the target driving power, and each line represents the accelerator pedal openings, respectively. Here, the accelerator pedal opening increases as each line moves towards the upper and right side of the figure. The right and uppermost line indicates the full open condition, that is, P=WOT ("wide open throttle", which means the throttle is fully open) of the accelerator pedal opening.

The target driving power estimating means 21 outputs and transmits signals of the target driving power to a lock-up clutch control apparatus 20 as well as to an engine control apparatus 22 which controls the engine so as to make it generate the target driving power. The engine control apparatus 22 electrically controls the throttle (TH) in response to the input target driving power and also electrically controls fuel injection in response to the target driving power.

Figure 4:
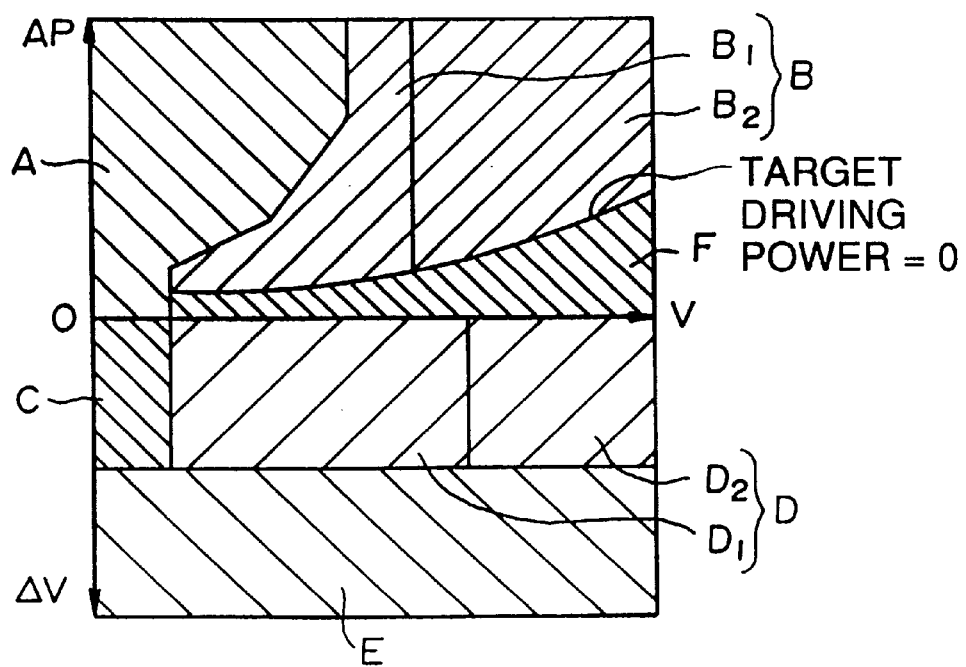
FIG. 4 shows control regions in a regional map for a clutch control apparatus according to an embodiment of the present invention.

As shown in FIG. 4, the lock-up clutch control apparatus 20 basically controls the lock-up clutch 18 based on the car speed (the horizontal axis) and the accelerator pedal opening AP (larger than 0 in the vertical axis) or a degree of speed reduction ΔV at the time of speed reduction (less than 0 in the vertical axis). It is also possible to use an engine load such as a throttle opening instead of the accelerator pedal opening. In FIG. 4, a region which is designated by the reference mark A corresponds to the off region (the engaging force is 0), wherein the lock-up clutch is not controlled. A region in FIG. 4 designated by the reference mark $B_1$ corresponds to the region wherein the lock-up clutch is feed-back controlled so as to obtain a target slip ratio, and a region designated by the reference mark $B_2$ corresponds to the region wherein the lock-up clutch is turned into a tight state (the engaging force is the maximum). Furthermore, the region in FIG. 4 designated by the mark C corresponds to the off region (the engaging force=0), wherein the lock-up clutch 18 is not controlled. In the region designated by the mark $D_1$, the lock-up clutch is feed-back controlled so as to attain the target slip ratio; and in the region designated by the mark $D_2$, the lock-up clutch is tightened. In addition, the region in FIG. 4 designated by the mark E is in a condition where the speed reduction is large and if the speed reduction ratio exceeds a predetermined value, corresponding to the panic braking condition, control of the lock-up clutch is then turned off (the engaging force is 0).

The region designated by the mark F in FIG. 4 corresponds to a region, wherein the lock-up clutch is controlled so as to reduce its engaging force, in order to relieve a shock which may occur at the time of acceleration or reduction of the car speed. Here, a border line between the region F and the regions $B_1$ and $B_2$ is the line on which the target driving force is zero.

Figure 5:
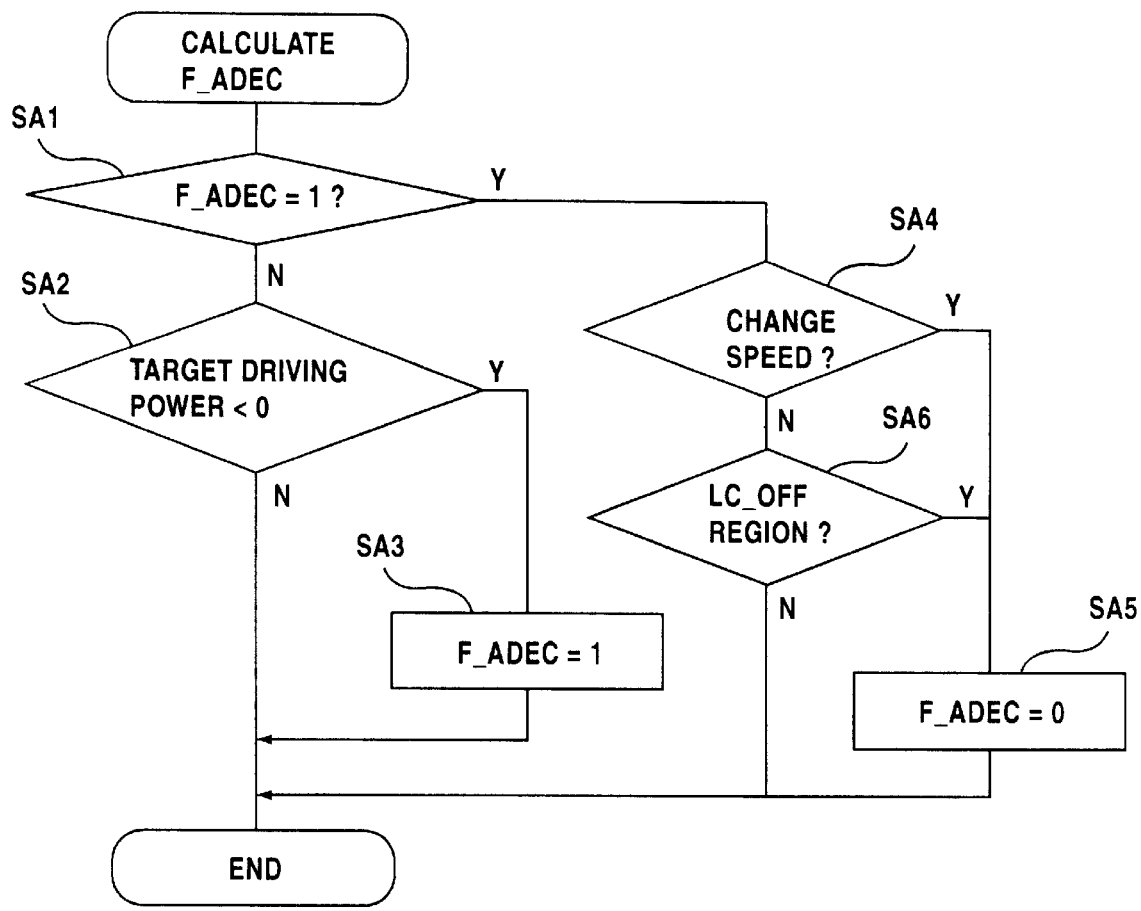
FIG. 5 is a flow chart showing a procedure for setting a flag F_ADEC according to one embodiment of the present invention.

The lock-up clutch control apparatus 20 sets a flag F_ADEC following a flow chart shown in FIG. 5.

At first, judgement is executed about whether or not the flag F_ADEC is 1 (one) at step SA1. In this step SA1, if the flag F_ADECis not 1, that is, F_ADEC=0, further judgement is executed whether or not the target driving power is less than a predetermined value (for example, 0) at step SA2. If the target driving power is less than the predetermined value (for example, 0), the flag F_ADEC is set 1 at step SA3. In contrast, if the target driving power is not less than the predetermined value, the routine is completed, leaving the flag F as F_ADEC=0.

On the other hand, if the flag F_ADEC is 1, the step is followed by step SA4 for judging whether or not gear change is in execution. If the judgement at this step is yes, that is, the gear change is in execution, the flag F_ADEC is set 0 at step SA5. If, on the contrary, the judgement at step SA4 is no, that is, the gear change is not in execution, a judgement is made at step SA6 as to whether or not the present condition is contained in the off region in the regional map showing the relationship between the car speed and the accelerator opening. If the present condition is in the off region in the regional map, the flag F_ADEC is set to 0 at step SA5. In contrast, if the condition at present is not contained in the off region, the routine is completed leaving the flag F as F_ADEC=1.

The lock-up clutch control apparatus comprises an acceleration/deceleration state judgement means 24 and the tightening permission judgement means 25.

The acceleration/deceleration state judgement means 24 is used for judging whether the car speed is going to be accelerated or is going to be reduced from the value of the flag F_ADEC. If the flag F_ADEC=0, that is, if the target driving power is estimated to be larger than the predetermined value (0, for example) after gear shifting or after the shifted state is contained in the off region in the regional map which shows the relationship between the car speed and the accelerator pedal opening, it is judged that the car speed is going to be accelerated. In contrast, if the flag F_ADEC=1, that is, after the target driving power is less than a predetermined value, and if, without changing the car speed, the state is not contained in the off condition in the regional map which shows the relationship between the car speed and the accelerator pedal opening, it is judged that the car speed is going to be reduced.

Figure 6:
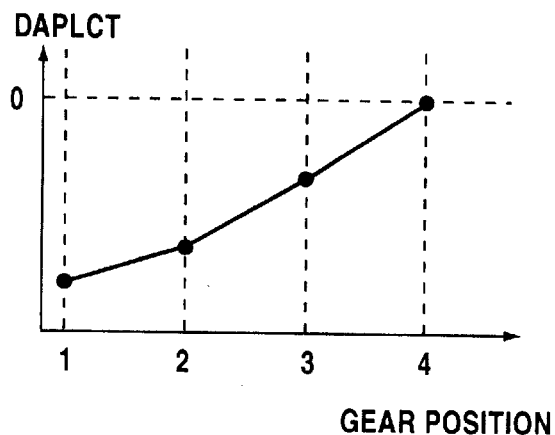
FIG. 6 is a table showing reference values of operating variations of the accelerator pedal for respective gear positions of the lock-up clutch control apparatus according to an embodiment of the present invention.

The tightening permission judgement means 25 possesses a table, as shown in FIG. 6, containing reference values of operating variations of the accelerator pedal per unit of time which is predetermined for each gear shifting position (hereinafter, simply called "operating variations"). This table corresponds to an automatic transmission with the four speed gear. The horizontal axis indicates each gear position corresponding to the first, second, third, and fourth gears, and the vertical axis indicates respective reference values DAPLCT for operating variations of the accelerator pedal. If the operating variations of the accelerator pedal DAP and the reference values DAPLCT are + (positive), it represents that the accelerator pedal is in depression state, and if those values are − (negative), it represents that the accelerator pedal is in a release state.

In this embodiment of the present invention, respective reference values DAPLCT of an operating variation of the accelerator pedal are set for respective gear positions, and 0 is set for the fourth gear, and the reference value DAPLCT of the operating variation of the accelerator pedal for the third gear is set at a value less than 0 which is set for the fourth gear. A predetermined value which is smaller than that for the third gear is set as a reference value DAPLCT for the second gear, and a predetermined value which is smaller than that for the second gear is set as a reference value for the first gear. Here, a differential value obtained by subtracting the reference value for the third gear from the reference value for the fourth gear is approximately equal to a differential value obtaining by subtracting the reference value for the second gear from the reference value for the third gear. The differential value between the reference values for the first gear and the second gear is set smaller than the above two differential values between the first and the second reference values and between the second and third reference values.

The above small differential value between reference values for the first gear and the second gear is caused by the following reason. That is, it is designed so that when gear shifting is carried out in a low speed range, and at the time when the lock-up clutch is intentionally tightened for maintaining good fuel consumption, drivability is preserved such that a relatively high absolute reference value is generally set from the point of view that it is necessary to avoid rapid change of the engine revolution responding to an operating variation of the accelerator pedal, and that it is assumed that the accelerator pedal may be depressed after it is slightly released, that is, depression and release of the accelerator pedal may be frequently performed in gear shifting at low gear positions. The relatively high reference value for the low gear is set by a series of test runs and it is confirmed that by setting such higher value for the first gear, the driver's intention is reflected in the gear shifting and the driver does not have an uneasy feeling.

That is, the above reference values DAPLCT for each operating variations of the accelerator pedal are predetermined for each gear position as values for deciding that the state, wherein the engine revolution is reduced by tightening the lock-up clutch, is preferable for not giving the driver an uneasy feeling.

The tightening permission judgement means 25 judges whether tightening of the lock-up clutch 18 is permitted or prohibited according to a result of comparison between the reference value DAPLCT at the present position and the operating variation DAP of the accelerator pedal. That is, the operating variation of the accelerator pedal DAP is obtained by estimation from the accelerator pedal opening AP which is contained in a signal output from the target driving power estimating means 21 and, on one hand, when said operating variation DAP of said accelerator pedal is smaller than the reference value DAPLCT, the tightening permission judgement means 25 permits tightening of the lock-up clutch, judging that the accelerator pedal is being released; and, on the other hand, when the comparison result is contrary to the above result, that is, the operating variation DAP is not smaller than the reference value DAPLCT, the tightening permission judgement means 25 prohibits tightening of the accelerator pedal. When tightening is permitted, the flag F_LCTGAP is set as F_LCTGAP=1, and when tightening is prohibited, the tightening flag F_LCTGAP is reset to F_LCTGAP=0.

Subsequently, the lock-up clutch control apparatus 20 controls two duty solenoids (not shown) so as to tighten to the maximum, when the flag F_LCTGAP is set by the tightening permission judgement means 25 and other conditions are ready to tighten the lock-up clutch 18. When, on the other hand, the flag F_LCTGAP is reset, the lock-up clutch control apparatus 20 controls two duty solenoids (not shown) in a range where the lock-up clutch 18 does not shift into the tighter position.

Figure 7:
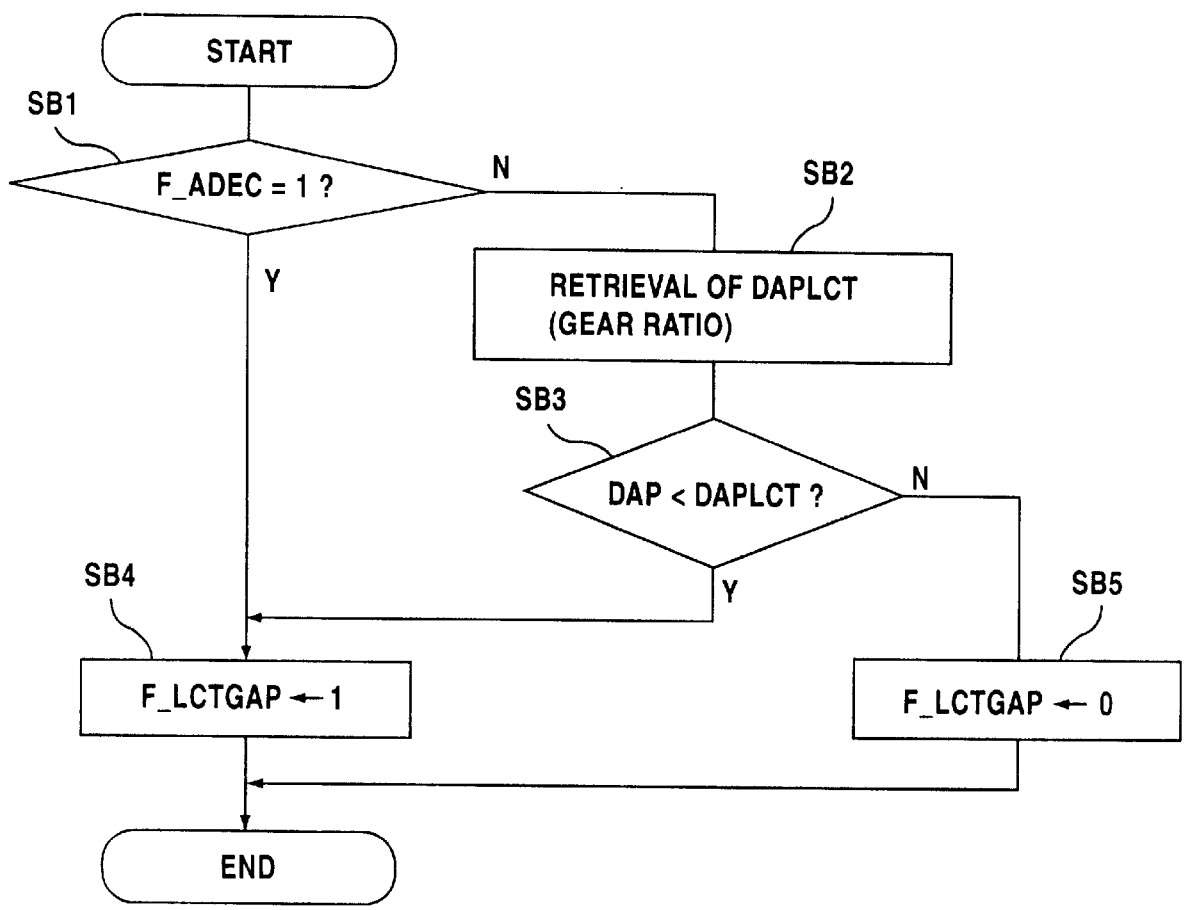
FIG. 7 is a flow chart showing a method of controlling the lock-up clutch control apparatus according to an embodiment of the present invention.

According to the flow chart shown in FIG. 7, the acceleration/deceleration state judgement means 24 of the lock-up clutch control apparatus 20 judges whether or not the flag F_ADEC=1 at step SB1. If the flag F_ADEC is not 1 (F_ADEC=0), that is, after the gear change, the accelerator pedal opening is contained in the off region in the regional map, and the target driving power is larger than the predetermined value (0, for example), and the car is going to be accelerated, the tightening permission judgement means 25 permits tightening towards the tighter position. That is, the reference value DAPLCT of the present condition is retrieved from the table shown in FIG. 6 at step AB3, and a comparison is made whether or not the operation variation DAP is smaller than the thus obtained DAPLCT at step SB3. If the result is smaller, it is judged that the accelerator pedal is being released, so that the flag F_CTGAP is set at step SB4, and the shift of the lock-up clutch to the tighter position is permitted at step SB5. If the result is contrary to the above result, the flag to tighten the lock-up clutch into the tighter position F_LCTGAP is reset at step SB5, and tightening of the lock-up clutch is prohibited.

When the acceleration/deceleration state judgement means 24 judges that the flag F_ADEC=1 at step SB1, that is, after the target driving power is less than a predetermined value, and, without performing the gear shift, the reference value is not contained in the off region in the regional map, it is judged that the car speed is going to be reduced. Subsequently, the tightening permission judgement means 25 sets the flag F_LCTGAP at step SB4, irrespective of the operating variation of the accelerator pedal, without performing judgement for permission of the shift to the tighter position at steps SB2 and SB3, and permits the lock-up clutch 18 to be tightened.

According to such lock-up clutch control apparatus 20, since the tightening permission judgement means 25 judges the permission or prohibition of shifting the lock-up clutch into a tighter position in accordance with the result of the comparison between the reference value DAPLCT of the present shift position and operating variation DAP of the accelerator pedal, it is possible to reflect the driver's will for acceleration or deceleration of the car speed.

That is, the lock-up clutch control apparatus 20 is designed so as to permit the shift of the lock-up clutch to the tighter position by judging that the accelerator pedal is being released, if the operating variation of the accelerator pedal is smaller than the reference value DAPLCT; and the lock-up clutch control apparatus is designed so as to prohibit the shift of the lock-up clutch to the tighter position, if the operating variation of the accelerator pedal is not smaller than the reference value DAPLCT. The above structure is makes it possible to avoid the uneasy feeling during driving by, for example, shifting the lock-up clutch into a tighter position when the accelerator pedal is depressing, which results in improved drivability.

Furthermore, the reference value to shift the lock-up clutch into a tighter position is set for each gear positions as the threshold values such that it is rendered possible to execute the appropriate judgement for each gear positions such as, for example, to tighten the lock-up clutch into a tighter position.

What is claimed is:

1. A lock-up control apparatus for a transmission comprising a plurality of gear positions, which has first and second operating regions defined by car conditions based on a car speed, an accelerator pedal opening, and a car speed deceleration, wherein the engine force of the lock-up clutch is controlled in the first operating region and the lock-up clutch is in an OFF state in the second operating region, comprising:

a region judgement means for judging whether the region of the car speed, the accelerator pedal opening, and the car speed deceleration are in the first operating region or the second operating region;

an acceleration/deceleration state judgement means for judging whether the car speed is in an acceleration state or a deceleration state;

a gear position detecting means for detecting the gear position among a plurality of gear positions of the transmission;

a variation of accelerator pedal estimation means for estimating variation of accelerator pedal predetermined for each gear position;

a memory means for storing a plurality of reference values of the accelerator pedal variation predetermined for each gear position;

a comparison means for comparing the variation of the accelerator pedal at present with the reference value for the present gear position stored in said memory means; and a tightening permission judgement means for permitting tightening of said lock-up clutch to a tighter position, when said region judgement means judges the car conditions are in the first operating region, and when said acceleration/deceleration state judgement means judges that the car speed is in the acceleration state, and when said comparison means judges that the variations of the accelerator pedal operation at present are smaller than said reference value.

2. A lock-up clutch control apparatus according to claim 1, wherein the lock-up clutch control apparatus comprising:

a tightening permission judgement means for permitting tightening of said lock-up clutch to a tighter position, if said acceleration/deceleration state judgement means judges that the car speed at present is in the deceleration state, said tightening permission judgement means for permitting tightening of said lock-up clutch to a tighter position without executing judgement by said comparison means.

* * * * *